US012763587B2

(12) United States Patent
Fei et al.

(10) Patent No.: US 12,763,587 B2
(45) Date of Patent: Oct. 13, 2026

(54) POWER MANAGEMENT CIRCUIT FOR MULTI-CELL POWER STORAGE DEVICES

(71) Applicant: Google LLC, Mountain View, CA (US)

(72) Inventors: Chao Fei, Menlo Park, CA (US); Douglas Osterhout, San Jose, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 1016 days.

(21) Appl. No.: 17/997,782

(22) PCT Filed: May 4, 2020

(86) PCT No.: PCT/US2020/031341
§ 371 (c)(1),
(2) Date: Nov. 2, 2022

(87) PCT Pub. No.: WO2021/225576
PCT Pub. Date: Nov. 11, 2021

(65) Prior Publication Data
US 2023/0179010 A1 Jun. 8, 2023

(51) Int. Cl.
*H02J 7/34* (2006.01)
*H02J 7/00* (2006.01)
*H02J 7/56* (2026.01)
*G06F 1/16* (2006.01)

(52) U.S. Cl.
CPC ................ *H02J 7/342* (2020.01); *H02J 7/56* (2026.01); *H02J 7/855* (2026.01); *G06F 1/1652* (2013.01); *H02J 2207/20* (2020.01)

(58) Field of Classification Search
CPC ....................................................... H02J 7/342
USPC ......................................................... 320/103
See application file for complete search history.

(56) References Cited

U.S. PATENT DOCUMENTS 7,893,562 B2 2/2011 Oga
10,439,404 B2 10/2019 Shen et al.
11,027,614 B2 6/2021 Nakao
11,407,311 B2 8/2022 Erhart et al.
(Continued)

FOREIGN PATENT DOCUMENTS

CN 104901358 A 9/2015
CN 207251270 U 4/2018
(Continued)

OTHER PUBLICATIONS

Notice of Intent to Grant from counterpart Japanese Application No. 2022-567187 dated Jul. 23, 2024, 5 pp.
(Continued)

*Primary Examiner* — Yalkew Fantu
(74) *Attorney, Agent, or Firm* — Shumaker & Sieffert, P.A.

(57) ABSTRACT

In general, techniques are described that are directed to a device having a first power storage device and a second power storage device connected in series. A first power converter may generate, using electrical energy sourced from the first power storage device and the second power storage device, a first power signal to power a first set of components. A second power converter may generate, using electrical energy sourced from the first power storage device and not the second power storage device, a second power signal to power a second set of components.

15 Claims, 5 Drawing Sheets

(56) References Cited

U.S. PATENT DOCUMENTS

| | | | | |
|---|---|---|---|---|
| 12,308,675 | B2 | 5/2025 | Sun et al. | |
| 2004/0130214 | A1 | 7/2004 | Murty et al. | |
| 2012/0065803 | A1* | 3/2012 | Teichmann | H02J 3/381 700/297 |
| 2015/0188350 | A1* | 7/2015 | Deboy | H02J 3/28 320/128 |
| 2016/0002062 | A1 | 1/2016 | Kita et al. | |
| 2016/0020621 | A1* | 1/2016 | Baby | H02J 7/0047 320/128 |
| 2018/0301912 | A1 | 10/2018 | Shen et al. | |
| 2019/0081487 | A1 | 3/2019 | Baby et al. | |
| 2019/0283625 | A1* | 9/2019 | Eriksson | H02J 7/0024 |
| 2022/0190607 | A1* | 6/2022 | Juang | H02J 7/007 |

FOREIGN PATENT DOCUMENTS

| | | | |
|---|---|---|---|
| CN | 110290973 | A | 9/2019 |
| CN | 110429673 | A | 11/2019 |
| JP | H07322516 | A | 12/1995 |
| JP | 2019030180 | A | 2/2019 |
| WO | 2007100035 | A1 | 9/2007 |
| WO | 2013048539 | A1 | 4/2013 |

OTHER PUBLICATIONS

Office Action, and translation thereof, from counterpart Korean Application No. 10-2022-7042136 dated Jun. 26, 2024, 12 pp.

Response to First Examination Report dated Jan. 3, 2023, from counterpart Indian Application No. 202247062878 filed Jun. 27, 2023, 16 pp.

First Office Action and Search Report, and translation thereof, from counterpart Chinese Application No. 202080100556.1 dated Jun. 18, 2025, 22 pp.

Response to Communication Pursuant to Rules 161(1) and 162 EPC dated Dec. 13, 2022, from counterpart European Application No. 20727797.1, filed May 2, 2023, 19 pp.

First Examination Report from counterpart Indian Application No. 202247062878 dated Jan. 3, 2023, 7 pp.

International Preliminary Report on Patentability from International Application No. PCT/US2020/031341 dated Nov. 17, 2022, 9 pp.

Office Action, and translation thereof, from counterpart Japanese Application No. 2022-567187 dated Jan. 9, 2024, 11 pp.

Diaz, "All the Incoming Foldable Phones for 2020: Toms Guid", Foldable Phone Media, Dec. 15, 2018, 14 pp.

International Search Report and Written Opinion of International Application No. PCT/US2020/031341, dated Aug. 10, 2020, 32 pp.

Response to First Office Action, and translation thereof, dated Jun. 18, 2025, from counterpart Chinese Application No. 202080100556.1 filed Oct. 15, 2025, 26 pp.

Second Office Action and Search Report, and translation thereof, from counterpart Chinese Application No. 202080100556.1 dated Dec. 4, 2025, 18 pp.

* cited by examiner

POWER MANAGEMENT CIRCUIT FOR MULTI-CELL POWER STORAGE DEVICES

BACKGROUND

The displays in portable electronic devices (e.g., mobile phones, foldable phones, laptop computers, etc.) are becoming larger. As display size increases, the displays may consume large amounts of power in a portable electronic device compared to other components (e.g., camera, processors, etc.). The increased power consumption resulting from a larger display may decrease usability of the portable electronic devices, especially when recharging power sources are not nearby or convenient. Although some portable electronic devices may feature larger batteries (e.g., having more cells or higher amperages), such batteries may increase weight and thereby decrease portability of the portable electronic device. Further, multi-cell batteries may require additional power management circuitry to balance energy storage between the multi-cell batteries, which may decrease the efficiency of the multi-cell batteries in terms of Amp hours (which equates to the duration by which the battery cells may operate).

BRIEF SUMMARY

According to examples of the disclosed subject matter, a power management circuit may provide system power, power management and power storage device charging capability in a device having a multi-cell power storage device. The multi-cell power storage device may include two or more power storage devices (which may be one way to refer to each cell of the multi-cell power storage device) connected in series, either of the same energy storage capacity or different energy storage capacity. The power management circuit may include an active balance circuit to transfer energy between each cell of the multi-cell power storage device in an efficient manner (e.g., compared to a passive balance circuit) to thereby improve the duration by which the power storage cells may operate. Increasing the efficiency may lead to longer operating duration, possibly making multi-cell power storage device suitable for smaller form factor devices (compared to a laptop computer and the like), such as a foldable mobile device or a tablet.

In addition to the active balance circuit, high power consuming electronic components (relative to low power consuming electronic components), such as a display and camera, may be connected to the combined output of the two or more power storage devices (or, in other words, cells) coupled in series. The low power consuming electronic components (relative to the high power consuming electronic components), such as a processor and antenna, may be electrically connected to the output of only one (or some subset that is less than all) of the power storage cells potentially having a power output lower than the other power storage cell. A desired cell capacity ratio may be achieved when the low power consuming electronic components draw power from the lower-power power storage device. The high-power consuming electronic components may draw power from both the lower power-power storage device and a relatively higher-power power storage device, which may improve operating efficiency (e.g., in terms of power consumption) of the high power consuming electronic components without potentially impacting operating efficiency of the low power consuming electronic components.

In one example, various aspects of the techniques are directed to a device having a first power storage device and a second power storage device connected in series. A first power converter may generate, using electrical energy sourced from the first power storage device and the second power storage device, a first power signal to power a first set of components. A second power converter may generate, using electrical energy sourced from the first power storage device and not the second power storage device, a second power signal to power a second set of components.

In another example, various aspects of the techniques are directed to a method for generating, by a first power converter and using electrical energy sourced from a first power storage device and a second power storage device, a first power signal to power a first set of components. Generating, by a second power converter and using electrical energy sourced from the first power storage device and not the second power storage device, a second power signal to power a second set of components. And, transferring, by an active balance circuit connected in parallel with the first power storage device and the second power storage device, energy between the first power storage device and the second power storage device.

In another example, various aspects of the techniques are directed to a power management circuit having a first power converter connected in parallel to a first power storage device and a second power converter connected in parallel to a second power storage device. The first power converter and the second power converter are configured to transfer energy between the first power storage device and the second power storage device. The first power storage device is connected in series to the second power storage device.

Additional features, advantages, and embodiments of the disclosed subject matter may be set forth or apparent from consideration of the following detailed description, drawings, and claims. Moreover, it is to be understood both the foregoing summary and the following detailed description are illustrative and are intended to provide further explanation without limiting the scope of the claims.

DETAILED DESCRIPTION

Figure 1:
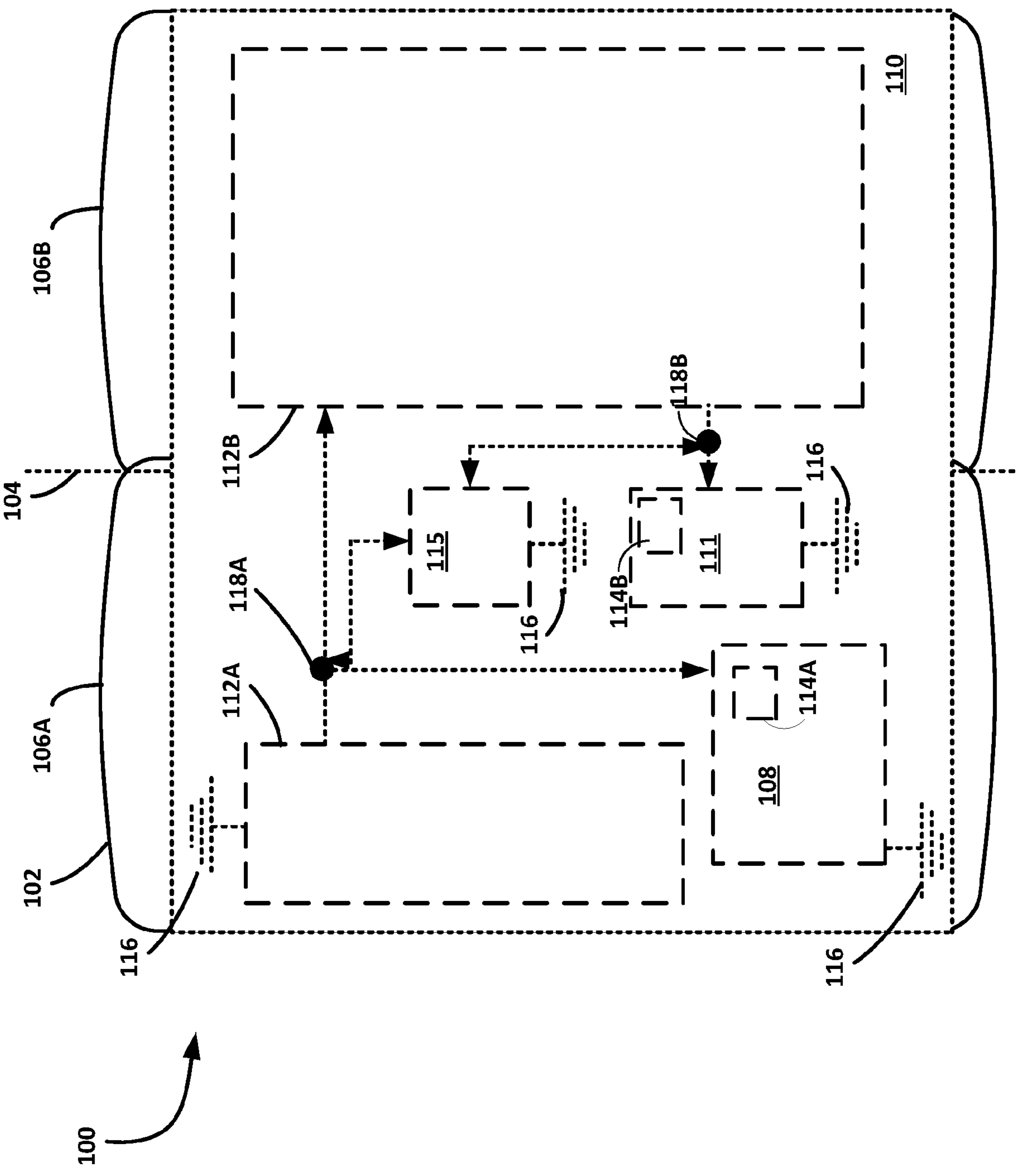
FIG. 1 is a block diagram illustrating a representation of a foldable mobile device in accordance with examples of the present disclosure.

FIG. 1 is a block diagram illustrating a representation of a foldable mobile device 100 in accordance with various aspects of the techniques described in this disclosure. Foldable mobile device 100 may represent any type of device capable of folding along an axis 104, including along a centered axis or an off-center axis. While described herein with respect to foldable mobile device 100, any type of device capable of being powered by two or more power storage devices may be configured according to the techniques described in this disclosure. Examples of such devices may include a mobile phone (including a so-called "smartphone"), smart glasses, a smart watch, a portable speaker (including a portable smart speaker), a laptop computer, a portable gaming system, a wireless gaming system controller, and the like.

Foldable mobile device 100 may include a housing 102 having a hinge or other element that enables folding along an axis 104, having a first half 106A and a second half 106B. Housing 102 may be formed from most any material such as metal (including aluminum), plastics (including most any polymer), glass, carbon fiber, etc. along with combinations of the materials in which first half 106A may have different or the same materials as second half 106B. While described with respect to "halves", foldable mobile device 100 may include a first portion and a second portion that are not equal or otherwise of approximately (within manufacturing tolerances) the same size. As such, first half 106A may be a different size, in some examples, compared to second half 106B, where first half 106A may only cover, when folded along axis 104, a portion of second half 106B (and not cover nearly the entirety of second half 106B).

Foldable mobile device 100 may include processing circuitry 108 and a display 110 as well as other components and/or circuitry (which are not shown in the example of FIG. 1 for ease of illustration purposes), such as global positioning system (GPS) electronics, accelerometers, gyroscopes, audio processing circuitry (e.g., a headphone jack and accompanying circuitry), one or more speakers, light emitting diodes (LEDs), one or more cameras, and the like.

Processing circuitry 108 may represent circuitry configured to support operation of foldable mobile device 100 and may execute software (or, in other words, a set of instructions) that may enable execution of hierarchical software layers to present various functionalities for use by a user. Processing circuitry 108 may, for example, execute a kernel forming a base layer by which an operating system may interface with various other processing units, such as a camera, microphones, sensors, etc. Processing circuitry 108 may also execute the operating system which presents an application space in which one or more applications (e.g., first party and/or third party applications) may execute to present graphical user interfaces with which to interact with the user.

Processing circuitry 108 may include one or more of a microprocessor, a controller, a digital signal processor (DSP), a central processing unit (CPU), a graphics processing unit (GPU), an application specific integrated circuit (ASIC), a field-programmable gate array (FPGA), or equivalent discrete or integrated logic circuitry. The functions attributed to processing circuitry 108 in this disclosure may be embodied as software (as noted above), firmware, hardware and combinations thereof. Although example foldable mobile device 100 of FIG. 1 is illustrated as including one processing circuitry 108, other example foldable mobile devices according to this disclosure may include multiple processors (or multiple so-called "cores," which is another way to refer to processors when packaged together) configured to execute one or more functions attributed to processing circuitry 108 of foldable mobile device 100 individually or in different cooperative combinations.

Display 110 may represent a device configured to emit light via an array of pixels and thereby output an image or a sequence of images (e.g., video). Display 110 may include one or more of a liquid crystal display (LCD), dot matrix display, light emitting diode (LED) display, organic light-emitting diode (OLED) display, touch screen, e-ink, or similar monochrome or color display capable of providing visible information to users of foldable mobile device 100. Display 110 may provide a user interface related to functionality provided by foldable mobile device 100. Display 110 may include a presence-sensitive display and/or touch-sensitive display that may enable interactions with a graphical user interface presented by display 110.

Although shown as a single display 110, display 110 may represent one or more displays. In some examples, display 110 may represent a single display capable of folding along axis 104. In other examples, display 110 may represent two displays, where one display is housed within half 106A and another display is housed within half 106B. When two or more displays are included in device 100, each of the displays may operate to present a continuous user interface or separate user interfaces. As such, various aspects of the techniques may enable foldable mobile device 100 to operate with a single display or multiple displays.

In addition, foldable mobile device 100 may include a display power management circuit 111, which may represent a circuit configured to manage power consumption by display 110. That is, display 110 may consume, on average, more power than processing circuitry 108, especially when display 110 operates at maximum brightness. As such, display power management circuit 111 may attempt to reduce power consumption of display 110 by adapting a brightness, resolution, contrast, or other parameters of display 110 to accommodate a current viewing context. For example, in bright viewing environments (e.g., when outside in direct sunlight), display power management circuit 111 may configure display 110 at a higher brightness then when in darker viewing environments (e.g., in a low light room or at night, not in direct sunlight and the like). Display power management circuit 111 may adapt other parameters in a similar manner.

Foldable mobile device 100 may also include a power storage device 112A and a power storage device 112B. Power storage device 112A may represent any type of electrical device capable of being charged via a power source (including fixed power sources accessible via electrical sockets and portable power sources, such as power banks comprised of, as one example, high wattage batteries) and storing energy when unconnected from any power source. One example of power storage device 112A is a battery, such as a lithium-ion battery, a nickel-cadmium battery, or any other type of rechargeable battery such as nickel-metal hydride, lead acid or lithium ion polymer.

Power storage device 112B may be similar to power storage device 112A, but may have a different wattage, storage capacity (as defined in milliamp hour, or mAh), size, configuration, etc., such variation being referred to herein as asymmetrical. Power storage device 112A and power storage device 112B may be referred to as batteries 112A and 112B, battery cells 112A and 112B, or cells 112A and 112B below. Although referred to as batteries 112A and 112B, various aspects of the techniques may be implemented with respect to any type of power storage device capable of powering a foldable mobile device 100 or any of the other devices discussed throughout this disclosure.

In devices having multi-cell batteries, such as laptop computers (which may also be referred to as "laptops"), the laptop or other multi-cell device may drive all electrical loads from two terminals, where each cell of the multi-cell battery are arranged in series and the first terminal couples to the first cell and the second terminal couples to the second cell. The first cell, as the cells are arranged in series, is coupled to the second cell, thereby allowing electricity to flow through the first cell and the second cell to drive the electrical loads (which may also be referred to as electrical components).

In addition, multi-cell devices may include a passive balance circuit that manages distribution of power to each cell of the batteries to ensure that certain cell tolerances are not exceeded. That is, each cell of a multi-cell battery has a stated charge rate at which the battery cell is capable of being charged and discharged. A 1 C charge rate, for example, indicates that a fully charged battery rated at one Amp hour (1 Ah) will provide one Amp (1 A) for one hour. The same 1 Ah battery will provide, at a 0.5 C charge rate, 500 milli-Amps (mA) for two hours, and at a 2 C charge rate, two Amps for 30 minutes. Exceeding the stated charge rate when charging or otherwise reenergizing the battery cell may damage the battery, thereby creating potential fire risks (for chemical batteries), skin burn (again for chemical batteries), etc. The passive balance circuit may ensure that the charge rate for each respective battery cell is not exceeded by balancing power between each cell of the battery.

Although not necessarily required when the battery cells are of the same charge rate and voltage, the laptop or other multi-cell device may still include the passive balance circuit configured to balance voltages between the different battery cells as there may be some differences as a result of manufacturing tolerances. The passive balance circuit may include a switch for each of the battery cells (when coupled in series), where the passive balance circuit may close the switch associated with the battery cell of the two battery cells having a higher voltage to discharge the higher voltage by a resistor (or other load).

As smartphones or other smaller mobile devices (relative to laptop computers) have increased in size, display 110 has also increased in size, which results in additional power consumption. Display 110 may represent one of the largest, if not the largest, source of power consumption as a relative percentage compared to processing circuitry 108 or any other component within foldable mobile device 100. In addition, given that foldable mobile device 100 may unfold to sizes approaching that of a small to mid-sized tablet, display 110 may consume significant portions (e.g., 50% when at maximum brightness) of the available power capacity of battery cells 112A and 112B.

To increase a usable duration of foldable mobile device 100, foldable mobile device 100 may utilize two battery cells 112A and 112B. Further, due to the foldable form factor of foldable mobile device 100, there is sufficient space within foldable mobile device 100 to house one of battery cells 112A and 112B in each of halves 106A and 106B. Although the increased battery duration provided by battery cells 112A and 112B may result in longer usable durations for foldable mobile device 100, foldable mobile device 100 may require some aspect of power management similar to the laptop computer noted above, thereby increasing the expense associated with producing foldable mobile device 100.

Moreover, as battery cells 112A and 112B are smaller in size and energy storage capacity than battery cells included in larger portable devices, such as a laptop computer, passive balance circuits may be inefficient in that the passive balance circuits may needlessly consume power through use of a resistor to expend differences in voltages between battery cells 112A and 112B. In other words, the passive balance circuit may balance energy using the resistor (or other non-functional load) without driving any functional component, which may be referred to as "inactive power consumption." Such loss of active power consumption (which may refer to power consumption by a function load or component) may be tolerable in a relatively larger device (such as a laptop, which is relatively larger compared to foldable mobile device 100), as such inactive power consumption may only consume a relatively small portion of the overall duration of the battery cells. However, inactive power consumption in foldable mobile device 100 may needlessly consume a larger portion of the overall duration of battery cells 112A and 112B, possibly preventing use of passive balance circuits.

In accordance with various aspects of the techniques described in this disclosure, foldable mobile device 100 may avoid driving all of the electrical components using both of batteries 112A and 112B, but instead power a first set of components using power output by both of batteries 112A and 112B, and power a second set of components using power output by only one of batteries 112A and 112B (or restated, a single one of batteries 112A and 112B). As shown in the example of FIG. 1, foldable mobile device 100 may output power from battery 112A (and not battery 112B) to processing circuitry 108, which as noted above may consume, on average, less power than display 110. Foldable mobile device 100 may output power from both of batteries 112A and 112B to display power management circuit 111 (which powers display 110), which may consume, on average, more power than processing circuitry 108.

In this way, the high-power consuming electronic components (e.g., power management integrated circuit 111 and/or display 110) may draw power from both batteries 112A and 112B, while the low power consuming electronic components (e.g., processing circuitry 108) may draw power from battery 112A. In some examples, a cell capacity ratio between each of cells 112A and 112B may be achieved when the low power consuming electronic components draw power from lower-power cell 112A and the high-power consuming electronic components draw power from both the lower power cell 112A and a relatively higher-power cell 112B. The cell capacity ratio may be designed, some instances, to improve operating efficiency (e.g., in terms of power consumption) of the high power consuming electronic components without potentially impacting operating efficiency of the low power consuming electronic components.

In operation, foldable mobile device 100 may include a first power converter 114A configured to generate, using electrical energy sourced from cell 112A, a first power signal to power processing circuitry 108 (which is an example of a first set of components). Power converter 114A may represent a direct current (DC) to DC power converter that converts DC signals from battery 112A (and not battery 112B) at a first voltage to DC signals of a different, second voltage. Examples of power converter 114A may include a step down (buck) power converter, a true buck-boost power converter, a step-up (Boost) power converter, a single-ended primary-inductor converter (SEPIC), an inverting (buck-boost) power converter, a split-pi (boost-buck) power converter, a forward power converter, a push-pull (half bridge) power converter, a full bridge power converter, a flyback power converter, and the like.

In the example of FIG. 1, power converter 114A may be internal to processing circuitry 108. Although shown as being part of processing circuitry 108, power converter 114A may, in some instances, be located outside of processing circuitry 108 or partially integrated with processing circuitry 108.

Foldable mobile device 100 may also include a second power converter 114B, which may be similar to, if not substantially similar, to power converter 114B in terms of potential functionality. However, power converter 114B may include a different type of power converter that may convert DC signals from a different third voltage to a different fourth voltage. In some examples, power converter 114B may convert DC signals from the same first voltage to the same second voltage as that to which power converter 114A converts DC signals. Power converter 114B may be configured to generate, using electrical energy sourced from both of batteries 112A and 112B, a second power signal to power display 110 (which may represent a second set of components).

As shown in the example of FIG. 1, display power management integrated circuit 111 may include power converter 114B. Although illustrated as being included within power management integrated circuit 111, power converter 114B may be separate from or partially integrated within power management integrated circuit 111.

In other words, a first power signal may power a first set of components, such as display 110, using electrical energy sourced from a first power storage device 112A and second power storage device 112B. First power storage device 112A may be connected in series with second power storage device 112B. A second power signal may power a second set of components, such as processing circuitry 108, using electrical energy sourced from second power storage device 112B and not first power storage device 112A.

As discussed in greater detail below, by splitting the first power signal and the second power signal between first power storage device 112A and second power storage device 112B display power management integrated circuit 111 can increase power efficiency by up to 5% for active mode and approximately 7% for idle mode. This proposed structure can also increase the life of power storage devices 112A and 112 B by greater than 3% potentially without additional space or cost.

In addition, foldable mobile device 100 includes an active balance circuit 115 configured to transfer energy between batteries 112A and 112B. Rather than expend any imbalances in energy using an inactive or inoperable load (e.g., a resistor), active balance circuit 115 may transfer the energy between batteries 112A and 112B To complete the circuit, ground 116 (which also may be referred to as "earth") is shown in the example of FIG. 1, which represents the reference point in an electrical circuit from which voltages are measured, a common return path for electric current, or a direct physical connection to the earth. Electrical circuits (e.g., processing circuitry 108 and display power management integrated circuitry 111) may be connected to ground 114 for several reasons (e.g., limiting the build-up of static electricity).

Further, the electrical circuit shown in the example of FIG. 1 includes terminal 118A and 118B, which may represent points at which a conductor from a component, device or network comes may be electrically coupled. Terminal 118A and 118B may, in other words, refer to an electrical connector at an endpoint, acting as the reusable interface to a conductor and creating a point where external circuits can be connected. Terminals 118A and/or 118B may simply be the end of a wire or it may be fitted with a connector or fastener.

Figure 2:
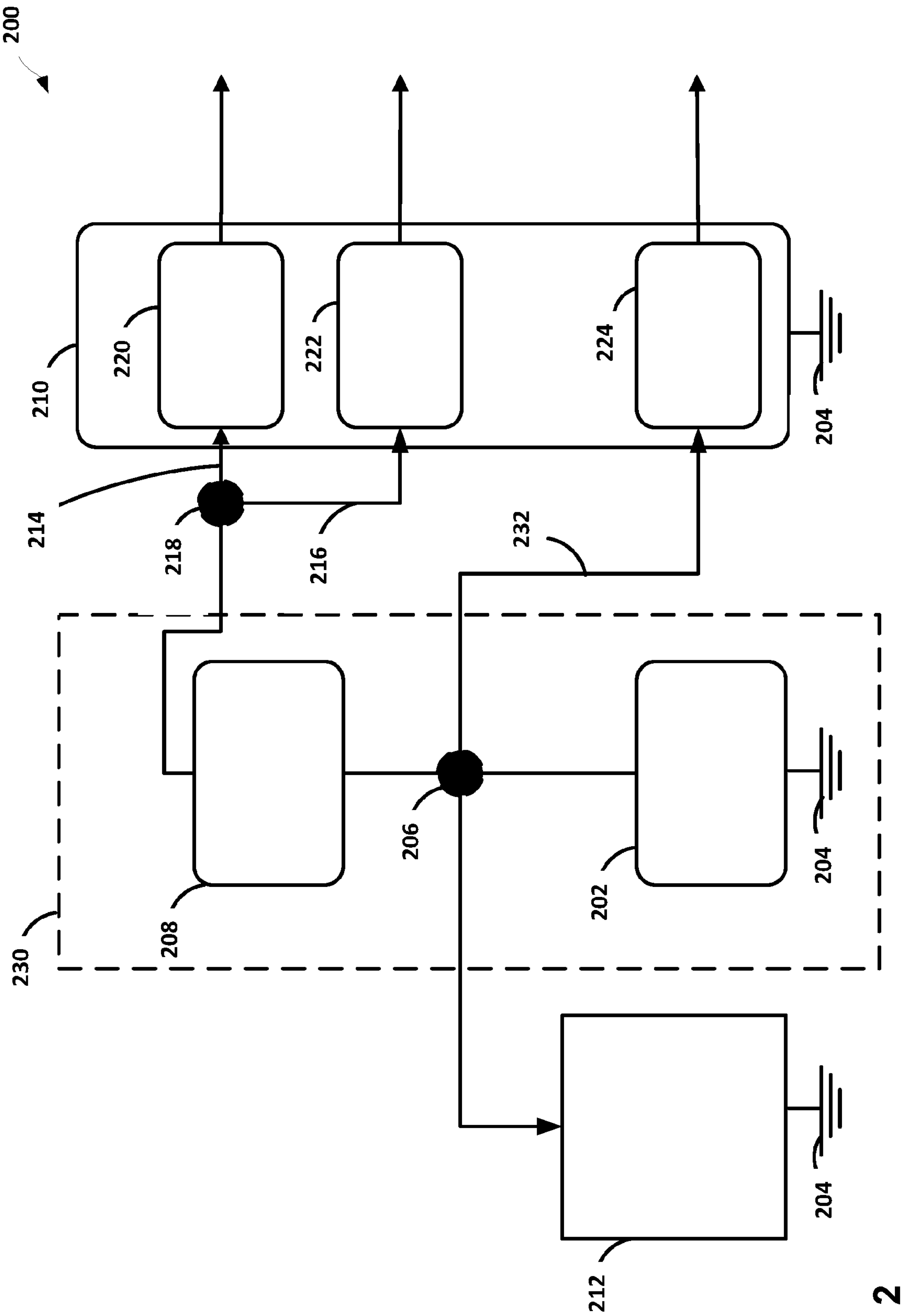
FIG. 2 is a diagram illustrating a schematic representation of a power architecture circuit for display power and charging power storage devices in accordance with examples of the present disclosure.

FIG. 2 is a diagram illustrating a schematic representation of a power architecture circuit 200 for display power and charging power storage devices 202 and 208 in accordance with examples of the present disclosure. Power architecture circuit 200 may represent one example of the circuit design of foldable mobile device 100. Power architecture circuit 200 may include a first power storage device 202 electrically connected to a ground 204 and to a terminal 206. A second power storage device 208 may be electrically connected in series to terminal 206 creating a two-cell power storage device 230. A display power management integrated circuit 210 may be electrically connected to second power storage device 208 and ground 204. Display power management integrated circuit 210 may be powered by both first power storage device 202 and second power storage device 208. Processing circuitry 212 may be electrically connected to terminal 206 and ground 204. Processing circuitry 212 may be powered by first power storage device 202.

Two-cell power storage device 230 may have three terminals: ground 204, $V_{Cell}$ (terminal 206) and $V_{Cell*2}$ (terminal 218). For loads benefiting from a higher supply voltage (e.g., display 110, camera, etc.), the loads may be electrically connected to ground 204 and terminal 218. Loads benefiting from a lower supply voltage (e.g., processing circuitry 212) may be electrically connected to ground 204 and terminal 206. The circuit layout of power architecture circuit 200 may increase power storage device life without additional space or cost.

Display power management integrated circuit 210 may have high-voltage couplings (e.g., rails) 214 and 216 electrically coupled to an output of second power storage device 208 at terminal 218. Another coupling 232 of display power management integrated circuit 210 may be electrically coupled to terminal 206. Power architecture circuit 200 may increase power storage device life by equal to or greater than three percent without additional space within housing 102 or any additional cost to foldable mobile device 100 by coupling high-voltage electronics directly to terminal 218 and low-voltage electronics directly to terminal 206.

As discussed above a larger display may significantly increase display power consumption. This problem may be further exacerbated by low efficiency related to power distribution to and within display power management integrated circuits. Techniques of the present disclosure may improve the efficiency of the display power management integrated circuit 210 and thereby extend the duration of power storage device 202 and 208. As displays grow larger and larger the amount of power they consume is growing. In portable electronic devices, even smaller displays consume a lot of power storage device capacity, e.g., 35% of power storage device life at 70% brightness and at max brightness the display may consume more than 50% of power storage device life. This problem is further exacerbated by the inefficiency of current display power management integrated circuits. On average current power management integrated circuits have an efficiency of 85% for a one-cell power storage device voltage input. Techniques of the present disclosure may improve this efficiency to 95% for a multi-cell power storage device.

In some display power management integrated circuits, which are coupled to a single power storage device, the display power management integrated circuit may include multiple amplification of voltages and some down converting of voltages in order to provide all the varying voltages required by a display. In some instances, a boost circuit within display power integrated circuit may amplify the battery voltage from approximately 3.7V to approximately 8V. The efficiency in this conversion may be approximately 80%. This voltage is then run through a low dropout regulator to regulate the voltage at 7.6V at about a 95% efficiency. Another boost circuit in the display power management integrated circuit converts the power storage device's 3.7V to 4.6V at approximately 90% efficiency. An inverting buck boost circuit down converts the 3.7V power storage device voltage to approximately −2.4V at 90% efficiency. Through all the power conversions discussed above, the overall efficiency of a traditional display power management integrated circuit for a single power storage device is, as one example, approximately 85%.

Power architecture circuit 200 may increase the display power management integrated circuit efficiency by approximately 5% for an active mode and approximately 7% in an idle mode. Active mode being when foldable mobile device 100 may be actively used and idle mode being when foldable mobile device 100 may not be actively used. High voltage coupling 214 may be coupled to boost converter 220 which receives a voltage input from terminal 218 and converts it to the high voltage of 7.6V used by display power management integrated circuit 210 and converts it at a 95% efficiency. Boost converter 220 (e.g., a step-up converter) may be a direct current to direct current power converter stepping up voltage (while stepping down current) from input 218 (supply) to its output (display 110). Boost converter 220 may be a class of switched-mode power supplies containing at least two semiconductors (e.g., a diode and a transistor) and at least one energy storage element: a capacitor, inductor, or the two in combination. Boost converter 220 may reduce voltage ripple and "clean" the voltage signal.

A buck boost converter 222 may receive the voltage from terminal 218 and down convert the voltage to 4.6V, also at a 95% efficiency. Buck-boost converter 222 may be a direct current to direct current converter having an output voltage magnitude less than the input voltage magnitude. An inverting boost buck converter 224 may invert and down convert the voltage from terminal 206 to −2.4V at a 95% efficiency. The output voltage may be of the opposite polarity than the input. Inverting boost buck converter 224 may be a switched-mode power supply with a similar circuit topology of boost converter 220 and buck converter 222. The output voltage is adjustable based on the duty cycle of the switching transistor.

In accordance with various aspects of the techniques of the preset description, power architecture circuit 200 may use a power storage device capacity structure providing for higher voltage electronics drawing energy from a combination of power storage devices 202 and 208 while low voltage electronics draw energy from just a single power storage device 202 (or in other examples multiple low power storage devices). In discussing a power storage device capacity structure, low voltage devices (e.g., processing circuitry 212, RF transmitters (not shown), etc.) may be grouped in a system #1 and high voltage devices (e.g., display power management integrated circuit 210, camera (not shown), etc.) may be grouped in a system #2 for the purposes of determining a power storage device capacity ratio based on usage. A power storage device balance circuit design of power architecture circuit 200 may be used due to power storage device tolerance and varying user's habits (e.g., not all people use their electronics in the same way; some users casually use their electronics, while others are heavy users of their electronics). Power storage device 202 may provide the power of System #1. While, half of power for System #2 may be provided by power storage device 208 and half may be provided from power storage device 202. The capacity ratio is set as:

$$\frac{\text{Battery 202 capacity}}{\text{Battery 208 capacity}} = \frac{\left(\text{System \#1 usage} + \frac{1}{2}\text{System \#2 usage}\right)}{\frac{1}{2}\text{System \#2 usage}}$$

For power storage devices 202 and 208 electrically connected in series, there are typically only two terminals (206 and 218). One terminal on the positive side (e.g., $V_{Cell*2}$ 218) and one on the negative side (e.g., ground 204). The two power storage device cells 202 and 208 electrically connected in series may be identical or asymmetrical (which is discussed in more detail below). While making power storage devices identical is difficult and tolerances exists, these tolerances are often handled by what is called a passive balance circuit.

As discussed above, differences between the power storage devices 202 and 208 will mean they will discharge at different rates. Also discussed above, passive balance circuits, while effective, are inefficient in the balance of charge between power storage devices 202 and 208 as the balance results in dissipated heat and lost energy. Examples of the present disclosure discuss below how this energy dissipation can be reduced and instead be moved from one power storage device to the other power storage device through an active balance circuit. An active balance circuit may operate bi-directionally to balance voltage between two asymmetrical power storage device cells 202 and 208 coupled in series to satisfy cell tolerance. An active balance circuit balances voltages by transferring energy from one power storage device cell to another power storage device cell, which is particularly advantageous for asymmetrical power storage device cells.

Figure 3:
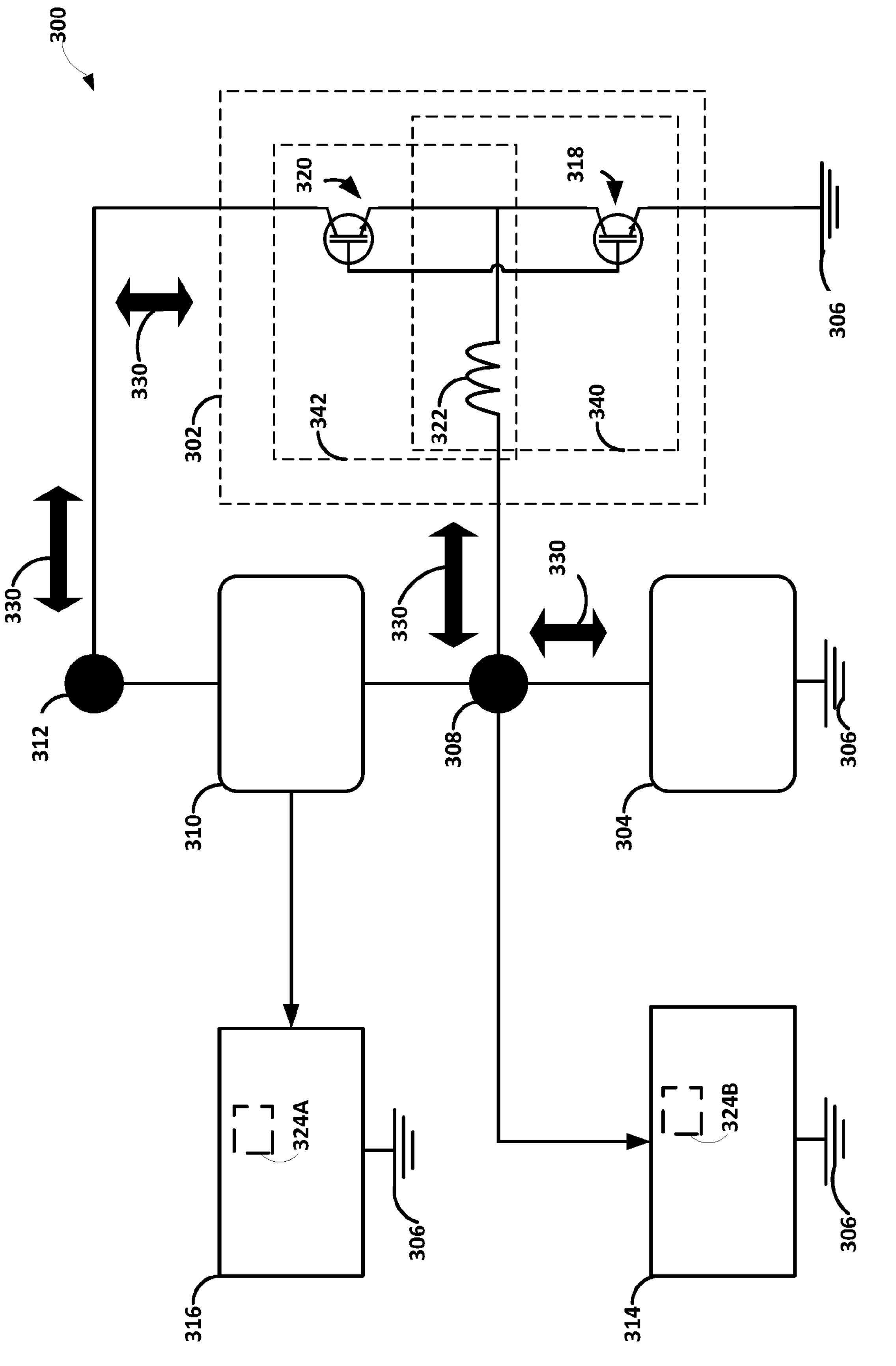
FIG. 3 is a diagram illustrating a schematic representation of a power architecture circuit with an active balance circuit in accordance with examples of the present disclosure.

FIG. 3 is a diagram illustrating a schematic representation of a power architecture circuit 300 with an active balance circuit 302 in accordance with examples of the present disclosure. A power architecture circuit 300, may have a first power storage device 304 electrically connected to a ground 306 and a first terminal 308. A second power storage device 310 may be electrically connected to first terminal 308 and a second terminal 312. A high-power electrical circuit 316 having a first power converter 324A may be coupled to the second terminal 312. A low power electrical circuit 314 having a second power converter 324B may be coupled to first terminal 308. An active balance circuit 302 may be electrically connected to ground 306, first terminal 308 and to second terminal 312.

Passive balance circuits may not be useful for power architecture circuits 200 and/or 300. A passive balance circuit is essentially a circuit having a switch in parallel with each of the power storage devices. If one power storage device has a higher proportional voltage than the other power storage device, then a switch associated with the higher proportional voltage power storage device will close and discharge the battery through a resistor to dissipate the excess voltage. For passive balance circuits, when there is an imbalance in power storage device voltage between two or more power storage devices, the voltage is dissipated through a resistor and lost.

Active balance circuit 302 may be connected in parallel with first power storage device 304 and second power storage device 310 and configured to transfer energy between first power storage device 304 and second power storage device 310. Active balance circuit 302 may have a third power converter 340 and a fourth power converter 342 configured to transfer the energy between first power storage device 304 and second power storage device 310. Third power converter 340 and fourth power converter 342 may be a direct current to direct current power converter. Third power converter 340 may operate as a buck converter to transfer the energy from second power storage device 310 to first power storage device 304. Fourth power converter 342 may operate as a boost converter to transfer the energy from the first power storage device to the second power storage device.

For active balance circuit 302, this imbalanced energy can be transferred from one power storage device 304 or 310 to the other power storage device 310 or 304 at high efficiency (e.g., 98% or about 2 mAh out of 100 mAh is dissipated versus all the energy lost in pass balance circuits). Furthermore, power storage devices 304 and 310 do not need to be identical and can be asymmetrical.

Active balance circuit 302 may balance the voltage between power storage device 304 and 310. Insulated gate bipolar transistors may be used for switching devices 318 and 320. In contrast to diode bridge rectifiers, pulse width modulated rectifiers achieve bidirectional power flow (i.e., power may flow in both directions as indicted by arrows 330). Third and fourth power convertors 340 and 342 may be a class of switched-mode power supplies containing at least two semiconductors, switches 320 and 318 and at least one energy storage element: inductor 322 in combination.

Active balance circuit 302 may have three ports, port 1 coupled to terminal 308, port 2 coupled to terminal 312 and ground 306. If there were a power storage device voltage imbalance and it was desirable to transfer energy from power storage device 310 to power storage device 304, active balance circuit 302 would operate a third power converter 340 as a buck converter and port 2 would act as an input from power storage device 310 and port 1 as an output to power storage device 304. Electrical charge would follow along arrows 330 from power storage device 310 to power storage device 304.

If it was desirable to transfer energy from power storage device 304 to power storage device 310, active balance circuit 302 would operate a forth power converter 342 as a boost converter and port 1 would act as an input from power storage device 304 and port 2 would act as an output to power storage device 310. Electrical charge would follow along arrows 330 from power storage device 304 to power storage device 310.

Active balance circuit 302 may be useful in correcting any imbalances between power storage devices 304 and 310, which can occur as each of power storage devices 304 and 310 discharge. As discussed above, not all users use their mobile devices, such as foldable mobile device 100, the same. Some are very active users and use display 110 heavily. Display 110 draws heavily from both power storage devices 304 and 310. However, if foldable mobile device 100 is also performing some tasks which require a lot of processing power, then low power electrical circuit 314 would be using power from battery 304. This use may create an imbalance, which active balance circuit 302 may address as the imbalance is detected, thus assuring a continuous balance of power storage device charge at a high efficiency transfer rate. This transfer process and efficiency rate can also be realized during charging.

Figure 4:
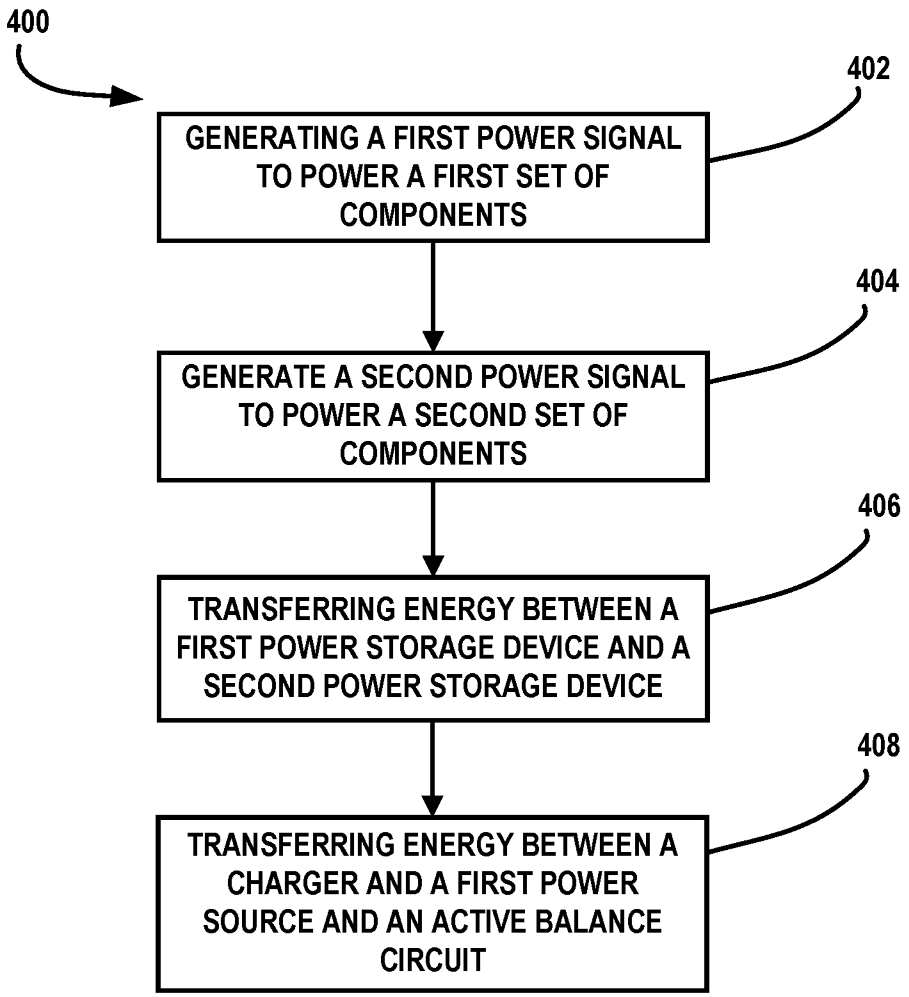
FIG. 4 is a flow diagram illustrating example operation of active balancing electrical charge between two or more power storage devices in accordance with examples of the present disclosure.

FIG. 4 is a flow diagram illustrating example operation of active balancing electrical charge between two or more power storage devices 304 and 310 in accordance with examples of the present disclosure. A first power converter 324A may generate, using electrical energy sourced from first power storage device 304 and a second power storage device 310, a first power signal to power a first set of components (402). A second power converter 324B may generate and use electrical energy sourced from first power storage device 304 and not second power storage device 310 to create a second power signal to power a second set of components (404).

Active balance circuit 302, connected in parallel with first power storage device 304 and second power storage device 310, may transfer energy between first power storage device 304 and second power storage device 310 (406). Active balance circuit 302 may have a third power converter 340 and a fourth power converter 342. Third power converter 340 may be a first direct current to direct current power converter. Fourth power converter 342 may be a second direct current to direct current power converter. Transferring the energy may involve operating third power converter 340 as a buck converter to transfer the energy from second power storage device 310 to first power storage device 304. Transferring the energy may involve operating fourth power converter 342 as a boost converter to transfer the energy from first power storage device 304 to second power storage device 310.

A charger may be connected to terminal 312 to provide a charging voltage for first power storage device 304 and second power storage device 310. The charger may transfer energy from the charger to second power storage device 310 and the first power storage device 304 via active balance circuit 302 (408). Transferring the energy from the charger to the second power storage device 310 can be performed directly as discussed in greater detail below. To charge first power storage device 304, third power converter 340 acts as a buck converter to transfer the energy from the charger to first power storage device 304. This operation is also discussed in greater detail below.

Figure 5:
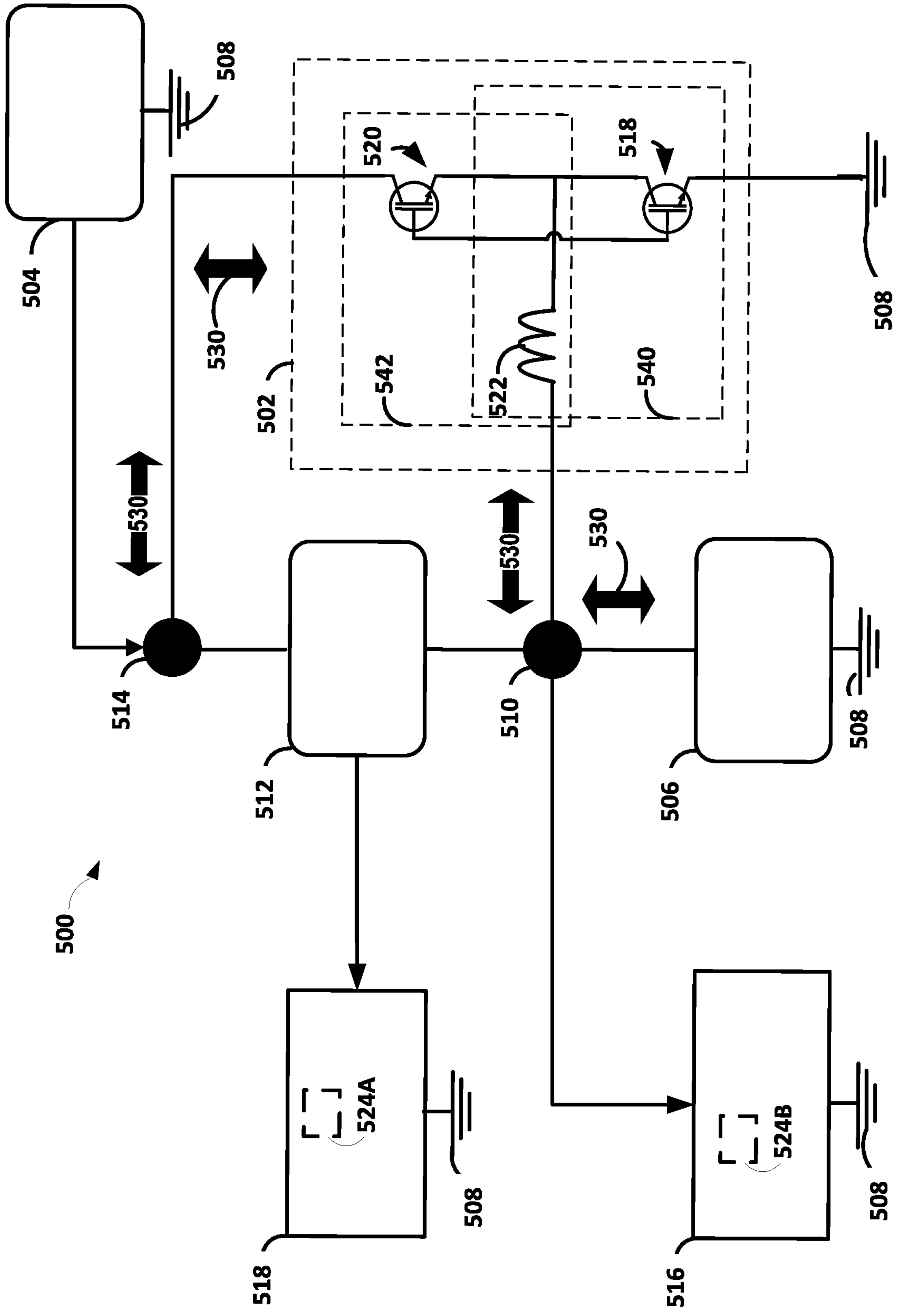
FIG. 5 is a diagram illustrating a schematic representation of a power architecture circuit with an active balance circuit coupled to a charger in accordance with examples of the present disclosure.

FIG. 5 is a diagram illustrating a schematic representation of a power architecture circuit 500 with an active balance circuit 502 coupled to a charger 504 in accordance with examples of the present disclosure. A power architecture circuit 500 may be similar to power architecture circuit 300 and may have a first power storage device 506 electrically connected to a ground 508 and a first terminal 510. A second power storage device 512 may be electrically connected to first terminal 510 and a second terminal 514. A high-power electrical circuit 518 having a first power converter 524A may be coupled to second terminal 514. A low power electrical circuit 516 having a second power converter 524B may be coupled to first terminal 510. An active balance circuit 502, having a third power convertor 540, with an inductor 522 and switch 518, and a fourth power converter 542, with an inductor 522 and switch 520, may be electrically connected to ground 508, first terminal 510 and second terminal 514. A charger 504 may be configured to be electrically connected to second terminal 514.

Power storage devices 506 and 510 and charger 504 may be designed to handle a specific charge (e.g., a 1 C charge). In a single power storage device system, this is a relatively easy process. If the power storage device was a 2000 mAh power storage device cell, then the charger may be designed to provide the cell with up to 2000 mA charging current. However, power architecture circuit 500 is a two-cell power storage device having a first power storage device 506 and a second power storage device 512. Furthermore, power storage device 506 and power storage device 512 may be asymmetrical further complicating the design of charger 504 and active balance circuit 502.

If power storage device 506 has a capacity of XmAh and power storage device 512 has a capacity of YmAh, then to meet a 1 C charging specification the charger 504 may be designed to have $$\frac{(X+Y)}{2}\text{mA}$$

output current capability. Furthermore, active balance circuit may be designed as having a $$\frac{|X-Y|}{2}\text{mA}$$

current balance capability to ensure power storage device 506 receives the proper output current capability.

For example, if power storage device 512 has a 3000 mAh current capability and power storage device 506 has a 1000 mAh current capability, then charger 504 may be designed to be $$\frac{(3000+1000)}{2} = 2000 \text{ mA}$$

charging current capability. Thus, the maximum charging current capability may be under the current capability of power storage device 512 and lessens the risk of overcharging or damaging power storage device 512.

Active balance circuit may be designed to be $$\frac{|3000-1000|}{2} = 1000 \text{ mA}$$

current balance capability. Thus, active balance circuit 502 protects power storage device 506 during charging by limiting the charging current to 1000 mA, which is the current capability of power storage device 506. Thus, charger 504 and active balance circuit 502 work together to ensure power storage devices 506 and 512 have a proper charging rate and ensure both power storage devices charge at a relatively equal rate.

The charger design and the active balance circuit design allow for power architecture circuit 200, 300 and 500 to not need to have symmetrical power storage devices. With the power architecture circuit design of examples and techniques of the present disclosure power storage devices of most any size and difference in size (within size constraints for the foldable mobile device 100) could be used and still function well. Furthermore, active balance circuit 502 ensures power storage devices 506 and 512 remain proportionately charged to provide the proper power supply to low power electrical circuit 516 and high-power electrical circuit 518 respectively.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A foldable device comprising:

a first portion;

a second portion, the first portion covering at least portion of the second portion when the foldable device is folded along an axis;

a first power storage device housed in the first portion;

a second power storage device housed in the second portion and connected in series with the first power storage device, wherein the first power storage device has a different power storage capacity than the second power storage device;

a first power converter configured to generate, using electrical energy sourced from the first power storage device and the second power storage device, a first power signal to power a first set of components;

a second power converter configured to generate, using electrical energy sourced from the first power storage device and not the second power storage device, a second power signal to power a second set of components; and an active balance circuit connected with the first power storage device and the second power storage device and configured to transfer energy between the first power storage device and the second power storage device.

2. The device foldable of claim 1, wherein the active balance circuit comprises at least a third power converter configured to transfer the energy between the first power storage device and the second power storage device.

3. The foldable device of claim 2, further including a fourth power converter configured to transfer the energy between the first and second power storage devices, wherein each of the third power converter and the fourth power converter comprises a direct current to direct current power converter.

4. The foldable device of claim 2, wherein the third power converter is configured to operate as a buck converter to transfer the energy from the second power storage device to the first power storage device.

5. The foldable device of claim 2, further including a fourth power converter configured to transfer the energy between the first and second power storage devices, wherein the fourth power converter are configured to operate as a boost converter to transfer the energy from the first power storage device to the second power storage device.

6. The foldable device of claim 1, wherein the first set of components consume more power, on average, than the second set of components.

7. The foldable device of claim 1, wherein the first set of components includes a display, and wherein the second set of components includes a processor.

8. The foldable device of claim 1, wherein the foldable device comprises a foldable mobile device or a foldable mobile tablet.

9. A method comprising:

generating, by a first power converter and using electrical energy sourced from a first power storage device and a second power storage device, a first power signal to power a first set of components, wherein the first power storage device has a different power storage capacity than the second power storage device;

generating, by a second power converter and using electrical energy sourced from the first power storage device and not the second power storage device, a second power signal to power a second set of components; and transferring, by an active balance circuit connected with the first power storage device and the second power storage device, energy between the first power storage device and the second power storage device, wherein the first power storage device has a different power storage capacity than the second power storage device, the first power storage device is housed in a first portion of a foldable device, the second power storage device is housed in a second portion of the foldable device, and the first portion cover at least portion of the second portion when the foldable device is folded along axis.

10. The method of claim 9, wherein the active balance circuit comprises at least a third power converter, the transferring including the third power converter altering the voltage from the first power storage device supplied to the second power storage device.

11. The method of claim 10, wherein the active balance circuit comprises at least a fourth power converter, the transferring including the fourth power converter altering the voltage from the second power storage device supplied to the first power storage device.

12. The method of claim 10, wherein transferring the energy comprises operating the third power converter as a buck converter to transfer the energy from the second power storage device to the first power storage device.

13. The method of claim 11, wherein transferring the energy comprises operating the fourth power converter as a boost converter to transfer the energy from the first power storage device to the second power storage device.

14. The method of claim 9, further comprising transferring, by a charger connected with the second power storage device and the active balance circuit, energy to the first power storage device and the second power storage device.

15. The method of claim 14, wherein the active balance circuit comprises at least a third power converter, the transferring including the third power converter altering the voltage from the charger to the first power storage device.

* * * * *